US005427187A

United States Patent [19]

Ilomäki

[11] Patent Number: 5,427,187

[45] Date of Patent: Jun. 27, 1995

[54] METHOD FOR ADJUSTING THE IMPACT FORCE ON A HAMMER

[76] Inventor: Valto Ilomäki, Loilantie 8, SF-33470 Ylöjärvi, Finland

[21] Appl. No.: 66,177

[22] PCT Filed: Nov. 29, 1991

[86] PCT No.: PCT/FI91/00361

§ 371 Date: Jun. 1, 1993

§ 102(e) Date: Jun. 1, 1993

[87] PCT Pub. No.: WO92/09788

PCT Pub. Date: Jun. 11, 1992

[30] Foreign Application Priority Data

Nov. 30, 1990 [FI] Finland ................................ 905906

[51] Int. Cl.[6] ......................... F21D 9/02; F16L 1/036

[52] U.S. Cl. .......................................... 173/1; 173/91; 173/128; 173/132; 173/17

[58] Field of Search .................... 173/1, 80, 90, 91, 73, 173/17, 200, 128, 132

[56] References Cited

U.S. PATENT DOCUMENTS 4,650,374 3/1987 Schmidt ............................ 173/128

FOREIGN PATENT DOCUMENTS

WO91/05137 4/1991 WIPO .

WO91/06798 5/1991 WIPO .

*Primary Examiner*—Scott A. Smith

*Attorney, Agent, or Firm*—Larson and Taylor

[57] ABSTRACT

A method for adjusting the impact force on a hammer operated by a compressible pressure medium utilizes a hammer including a working cylinder having a to-and-fro moving percussion piston and a spindle positioned therein for striking a tool. The working cylinder is positioned inside an outer shell and the spindle is attached to the outer shell. The working cylinder is movable relative to the outer shell and the spindle. A pressure chamber is formed between the working cylinder and the outer shell and pressure medium is fed into or removed from the chamber to adjust the position of the working cylinder relative to the outer shell. In making this adjustment, the strength and frequency of impact of the piston against the opposite end of the spindle is adjusted.

7 Claims, 1 Drawing Sheet

METHOD FOR ADJUSTING THE IMPACT FORCE ON A HAMMER

FIELD OF THE INVENTION

The invention relates to a hammer driven by a pressure medium, especially compressed air, a method for adjusting and securing the strength of blow of the hammer, and a method of using the hammer for tunnel drilling in which the hammer is in the working pit at all times during drilling.

BACKGROUND OF THE INVENTION

Previously known, i.e., from Finnish patent application No. 895057, is a method of forcing tandem cylinders into soil by means of a hammer in the working pit. In the method, a conventional, non-rotatable hammer is used. The cylinders can only penetrate soft and granular soil, such as man-made road embankments.

Hammers are known as devices which direct the blows towards a tool while drivers are devices which drive the whole hammer in the direction of blow. Typically, these machines are used for working downwards, such that the hammer functions by means of gravity in all situations if operating in other directions, it is necessary to provide for a counterforce for the hammer so that there will be no stoppage because of dead travel.

In forcing cylinders into soil by means of a hammer, the first cylinder of which has the function of a tool, the disadvantage is that the forward movement stops if a large stone is hit, which cannot give way to the inside or outside of the cylinder. The forward movement can be stopped even by small rock walls which tend to change the direction if the cylinders are not rotated. The disadvantage of conventional hammers is the stopping of blows during operation. This is especially true at the first stage upon starting to force the cylinders into soil when they penetrate easily and there is no counterforce for the hammer, thereby causing the strokes to stop and disturb operation.

SUMMARY OF THE INVENTION

With a hammer and a method for securing and adjusting the strength of blow and use of a hammer for tunnel drilling according to the invention, crucial improvements have been reached on the above described disadvantages.

The most valuable improvement of the invention is the fact that the hammer functions under all conditions and the strength and frequency of its blow can be adjusted according to soil qualities without adjusting the feed pressure of the medium, and by rotating the hammer the tunnel can be drilled with a rotating tube system built of tandem cylinders penetrating the soil by means of hammer blows. Since the frequency of the hammer blows can be adjusted, the rotating cylindric tool can advance even in rock and crush stones when the optimum stone-crushing frequency is selected.

BRIEF DESCRIPTION OF THE DRAWINGS

In the following the invention is described in detail with reference to the enclosed drawings, in which.

DESCRIPTION OF THE PREFERRED EMBODIMENTS

Figure 1:
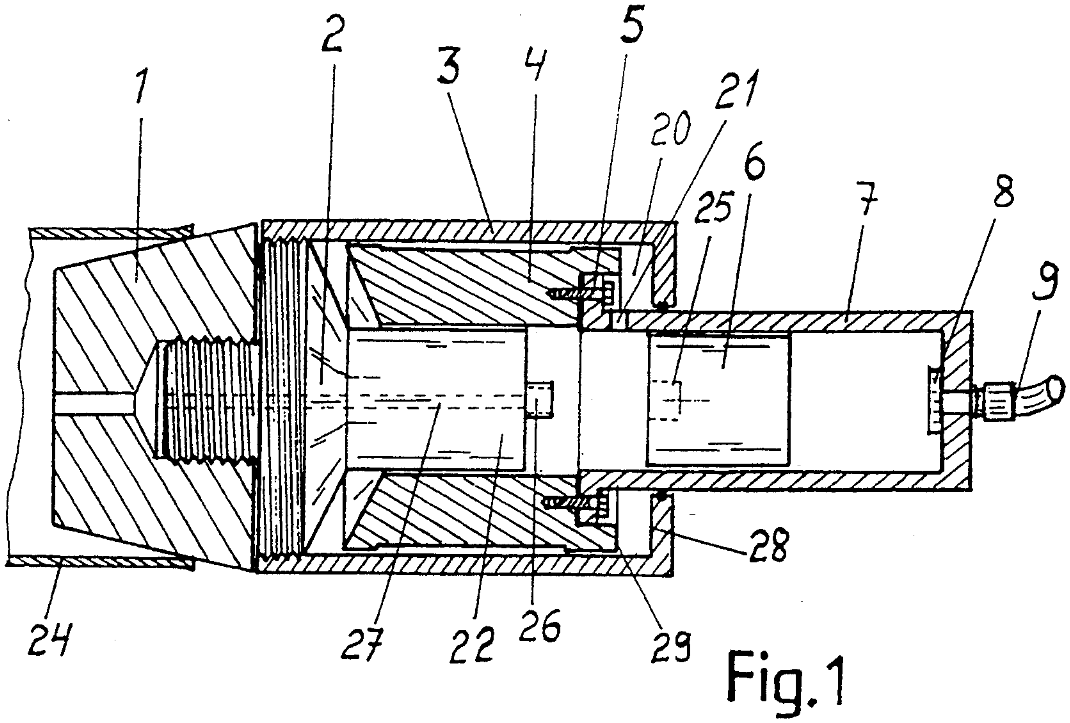
FIG. 1 is the cross-section of a hammer.

FIG. 1 shows a hammer with a detachable tool 1. Piston 6 in cylinder 7 strikes spindle 22 which transmits the stroke to front side 2 of spindle and to the tool. There is a notch 25 in the piston matching bushing 26 in spindle 22. When the piston hits bushing 26, the access into channel 27 of pressure medium escaping into the front of the piston 6, is prevented and in front of the piston 6 pressure starts to generate, throwing the piston 6 back to the other end of cylinder 7. Travel of stroke is maintained by this function. Value 8 does not allow entrance of further pressure into the cylinder while the piston is striking and reversing. In spindle front space 2 a shell 3 is fastened by threads and moves with spindle 22 and the tool 1. The working cylinder 7 is fixed by screws 5 to guiding part 4. The return system of the hammer requires that the piston 6 hits the spindle 22 at a distance. If, for instance, the spindle has moved as much as a dead stroke or, because of lack of counterforce, to its extreme position, then the piston 6 does not reach the spindle 22 at the right moment necessary for the piston 6 to reverse and the hammer stops.

In order to avoid this, in the outer shell 3 a circular chamber 20 within walls 28 and 29 is formed. In leading pressure through opening 21 from the piston front space to this chamber 20, the spindle 22 and working cylinder 7 are forced to come closer to each other between strokes. By this means the return travel of piston 6 and uninterrupted striking frequency are secured. Working pressure is led to the hammer along tube 9 in the cylinder head and there is a pressure distributing shut-off device 8. In the hammer head there is a soil penetrating cylinder 24 fastened to tool 1 with a conical compression connection. From the piston front, pressure can be led into cylinders 24, for instance through boring 27 in spindle 22. Thereby pressure is used as helping means for strokes in emptying soil material from cylinders. This requires that the hammer is fixed to cylinder 24 by appropriate strong means.

Also with the hammer not in function, soil can be emptied from cylinder 24, wherein cone 1 functions as shut-off plate at cylinder beginning and pressure medium is directed through the hammer into the cylinder, whereby soil material is swept out by pressure medium flow from the other end of the cylinder.

Figure 2:
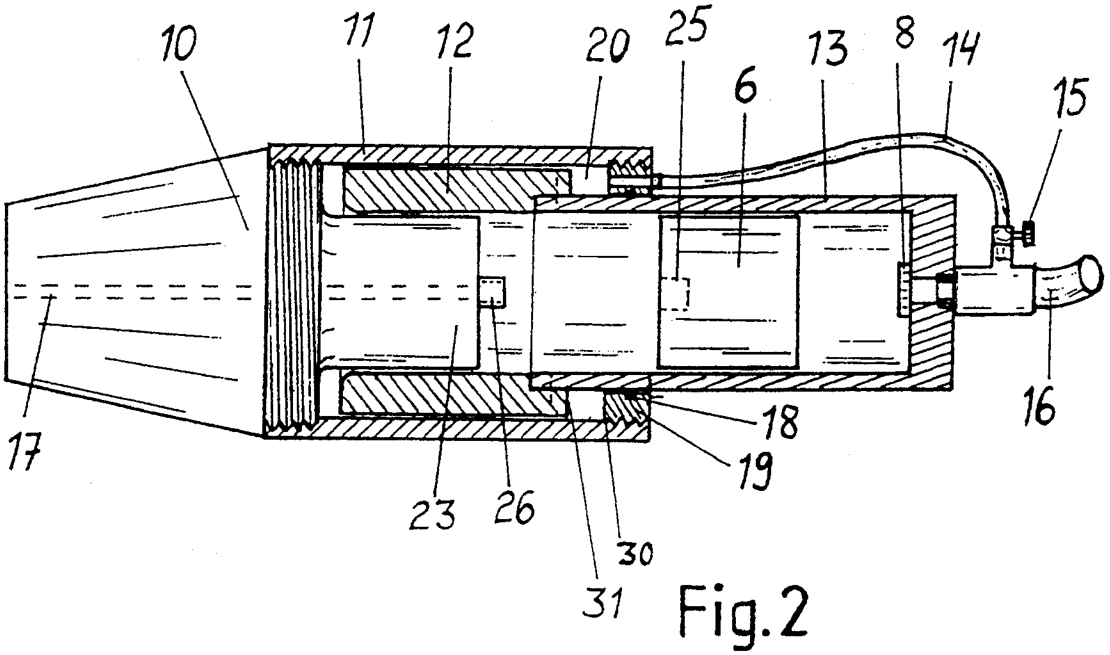
FIG. 2 is an alternative hammer construction.

FIG. 2 shows a hammer of somewhat modified construction, where spindle 23 and tool 10 are one and the same component. Through the spindle 23 a boring 17 is made. The piston 6 travels in working cylinder 13 and hits spindle end 26. In the cylinder there is a guiding part 12 which is sliding with respect to outer shell 11 and end 23 as well. Along pipe 14 pressure is led direct from the working pressure supply into a circular pressure chamber 20 within walls 30 and 31. In the tube connector there is a pressure regulating valve. Circular part 19 including packing 18 prevents leaks of compressed air from chamber 20 and allows movement between outer shell 11 and working cylinder 13. Oil, contained in compressed air, lubricates sliding surfaces inside the hammer. By means of regulating valve 15 the pressure in the circular chamber can be controlled and, accordingly, the striking frequency affected. By means of working pressure adjustment, the strength and frequency of blow can be adjusted.

The hammers illustrated in both figures are most excellently applicable to driving cylinders into soil, since the conical tool element can be compressed by strokes into the cylinder without disturbing the hammer function. By using tandem cylinders for drilling, rotation of the same can be arranged advantageously by rotating the hammer, from which the torsion is transmitted to the cylinders. Hammer rotation can be effected by many familiar techniques without disturbing the strength of blow, for instance by means of an outside rotation engine. In rotating and striking the cylinders, which function as a tool, especially when the front end of the first cylinder is well fit for strokes, it is possible to penetrate even a rock if you happen to hit one. This method is especially applicable for splitting big stones in front of the cylinders and if the stones are of such size that they cannot give way to the cylinder forward movement. Rotation of this kind of hammer is made easy by a cylinder shell 3, 11 at the hammer head, from where the rotation is transmitted directly to the hammer head.

The tool head in a hammer according to the invention can even be a rock-drilling tool, used instead of part 1 in the solution in FIG. 1, whereby the hammer can be used for drilling big holes in rock. For hammer adjustment the pressure channels or pipes to the circular chamber can be furnished with different control and shut-off means. A hammer in accordance with the invention needs only one sort of pressure medium and adjustment of function can be carried out with this medium.

I claim:

1. A method for adjusting the impact force on a hammer operated by a compressible pressure medium, said hammer comprising a working cylinder having a to-and-fro moving percussion piston and a spindle positioned therein, one end of said spindle extending out of said working cylinder and having a tool attached thereto, said method comprising the steps of:

positioning at least a portion of said working cylinder inside an outer shell;

attaching the one end of said spindle to said outer sheet and slidably within said working cylinder, said working cylinder being movable relative to said outer shell and said spindle;

forming a pressure chamber between said working cylinder and said outer shell; and feeding pressure medium into and removing pressure medium from said pressure chamber to adjust the position of said working cylinder relative to said outer shell, in order to vary the force of impact of said piston against an opposite end of said spindle.

2. The method according to claim 1 wherein said pressure medium is fed into said pressure chamber to move said working cylinder closer to the tool.

3. The method according to claim 1 wherein said pressure medium is fed into and removed from said pressure chamber by means of a line extending from outside of said outer chamber and said working cylinder directly into said pressure chamber.

4. The method according to claim 3 wherein said tool and said spindle comprise a single component.

5. The method according to claim 1 wherein said pressure medium is fed into and removed from said pressure chamber by means of a channel extending from a space inside of said working cylinder between said spindle and said piston into said pressure chamber.

6. A method of drilling a tunnel by forcing tandem cylinders into soil, said cylinders being attached to a hammer operated by a compressible pressure medium, said hammer comprising a working cylinder having a to-and-fro moving percussion piston and a spindle positioned therein, one end of said spindle extending out of said working cylinder and having a tool attached to the one end of said spindle, said method comprising the steps of:

positioning at least a portion of said working cylinder inside an outer shell and attaching the one end of said spindle to said outer shell and slidably within said working cylinder, said working cylinder being movable relative to said outer shell and said spindle, said tool extending out of said outer shell;

forming a pressure chamber between said working cylinder and said outer shell;

joining said tool to a rearmost cylinder of said tandem cylinders;

applying working pressure to said percussion piston such that said piston strikes and opposite end of said spindle and transmits an impact force to said tool; and feeding pressure medium into and removing pressure medium from said pressure chamber to adjust the position of said working cylinder relative to said outer shell of said piston against the opposite end of said spindle.

7. The method according to claim 6 further comprising the step of directing pressure medium from a space between said spindle and said piston inside of said working cylinder through a channel in said spindle and said tool into said rearmost cylinder for removing soil material from said tool.

* * * * *